(12) United States Patent
Girardin

(10) Patent No.: US 6,287,060 B1
(45) Date of Patent: Sep. 11, 2001

(54) WHEELCHAIR RESTRAINT SYSTEM

(76) Inventor: Jean Marc Girardin, 16-100 Sheldon Drive, Cambridge, Ontario (CA), N1R 7S7

( * ) Notice: Subject to any disclaimer, the term of this patent is extended or adjusted under 35 U.S.C. 154(b) by 0 days.

(21) Appl. No.: 09/620,241

(22) Filed: Jul. 20, 2000

(51) Int. Cl.[7] .................................................. B60P 3/06
(52) U.S. Cl. ................................... 410/7; 410/4; 410/11; 410/12
(58) Field of Search .............................. 280/250.1, 304.1, 280/748; 410/3, 4, 7, 8, 9, 10, 11, 12, 23, 104, 105, 100

(56) References Cited

U.S. PATENT DOCUMENTS

| 4,492,403 | * | 1/1985 | Blomgren et al. | 296/68.1 |
|---|---|---|---|---|
| 4,688,843 | * | 8/1987 | Hall | 296/65.04 |
| 4,886,403 | * | 12/1989 | Gresham | 410/10 |
| 4,995,775 | * | 2/1991 | Gresham | 410/10 |
| 5,026,225 | * | 6/1991 | McIntyre | 410/23 |
| 5,391,030 | * | 2/1995 | Lee | 410/4 |

* cited by examiner

*Primary Examiner*—Paul N. Dickson
*Assistant Examiner*—Faye M. Fleming
(74) *Attorney, Agent, or Firm*—Richards J. HIcks

(57) ABSTRACT

A wheelchair restraint system which includes a floor mounting track, anchor means slidably mountable in said mounting track, a seat belt retractor means and a rigid bracket means for mounting the retractor means to the anchor means, swivelly mounted at one end thereof to said anchor means so as to hold said retractor means at a selected angle, greater than zero, relative to said floor mounting track. In a preferred embodiment a seat belt anchor pin is also mounted in overlying relationship to the seat belt retractor means.

4 Claims, 4 Drawing Sheets

WHEELCHAIR RESTRAINT SYSTEM

FIELD OF INVENTION

This invention relates to wheelchair restraint systems, and more particularly to a device to mount a seat belt retractor to a floor track.

BACKGROUND OF INVENTION AND PRIOR ART

Wheelchair restraint systems are, of course, well known and many patents have been granted thereon. Attention is directed to the systems marketed by Giram LLC of Fort Lauderdale, Fla., and to U.S. Design Pat. No. D3413,080 issued Aug. 24, 1999 which shows a seat belt retractor of the type contemplated by the present invention, and to the Universal Seat Restraint System shown in U.S. patent application 09/387,841 filed Sep. 1, 1999. Such retractors are generally removably mounted on a floor track or fitting, which is permanently mounted on the floor of the bus or van used to convey the wheelchair and occupant, by way of an appropriate connector. Preferably, but not essentially, the retractor is flexibly mounted to the connector so as to allow some pivotal movement of the retractor relative to the track. Typically, in the prior art, this flexibility has been provided by an unsupported ring structure so that the retractor can move in both a vertical and horizontal plane. When not in use the reteractor normally lies on the floor of the vehicle where it may collect dust and dirt and may move in a horizontal plane around the tether point, and thus out of reach of the wheelchair occupant. This is a considerable disadvantage which the present invention, in part, aims to address. Also in the prior art systems, the lap belt anchor point has been provided separately from the seat belt retractor, and it is seen as an advantage to provide a lap belt anchor point integrally with the seat belt retractor.

OBJECT OF INVENTION

It is, therefore, an object of the present invention to provide a wheelchair seat belt retractor system which provides pivotal movement of the retractor in a single plane, preferably at about 45° to the horizontal, so as to keep the retactor away from the floor of the vehicle.

Another object of the invention is to provide a seat belt retractor with an integral lap belt mounting point.

BRIEF DESCRIPTION OF INVENTION.

By one aspect of this invention there is provided in a wheelchair restraint system for use in a passenger carrying vehicle, which comprises a longitudinal floor mounting track having a plurality of parallel transverse slots therethrough, anchor means releasably and lockably mountable in a selected said slot in said mounting track, a seat belt retractor means and pivoting means for mounting said retractor means to said anchor means, the improvement wherein said pivoting means comprises first bracket means swivelly mounted at one end thereof to said anchor means so as to hold said retractor means at a selected angle, greater than zero, relative to said floor mounting track.

By another aspect of this invention there is provided in a wheelchair restraint system for use in a passenger carrying vehicle, which comprises a floor mounting track, anchor means slidably mountable in said mounting track, a seat belt retractor means and pivoting means for mounting said retractor means to said anchor means, the improvement wherein said pivoting means comprises first bracket means swivelly mounted at one end thereof to said anchor means so as to hold said retractor means at a selected angle, greater than zero, relative to said floor mounting track, and including a lap belt attachment bracket mounted on said first bracket means at a second end thereof so as to overlie said retractor means.

DETAILED DESCRIPTION OF PREFERRED EMBODIMENTS

Figure 1:
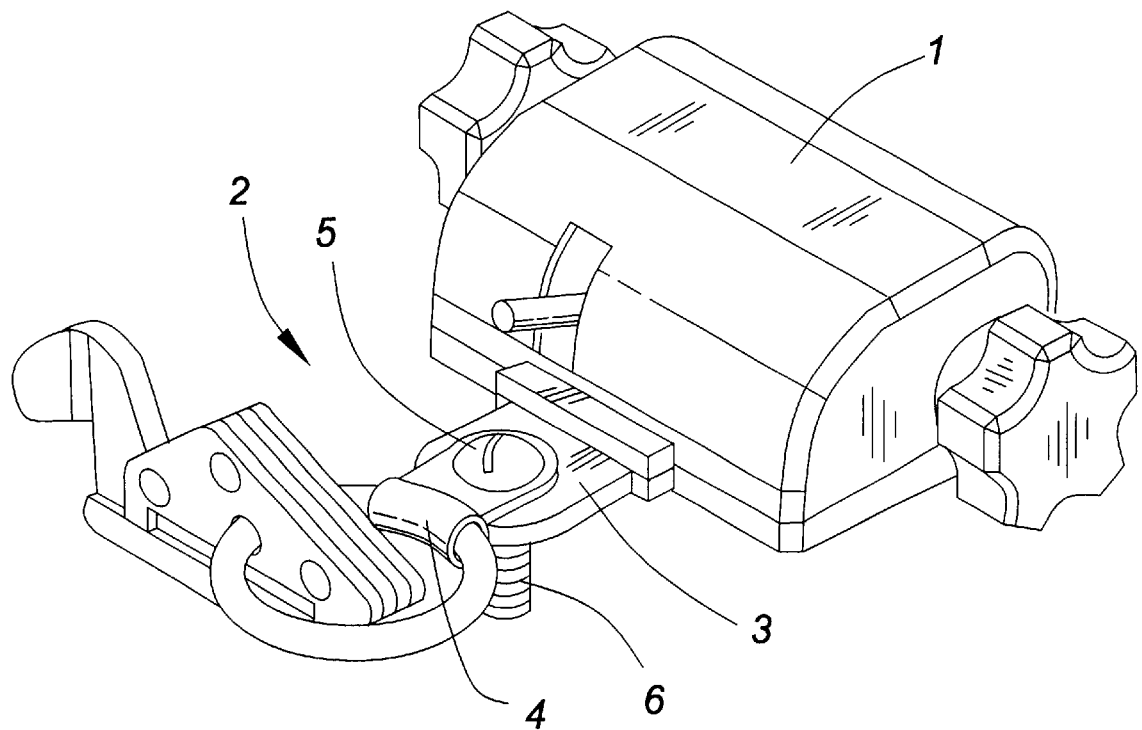
FIG. 1 shows a sketch of a seat belt retractor attachment system according to the prior art.
Figure 2:
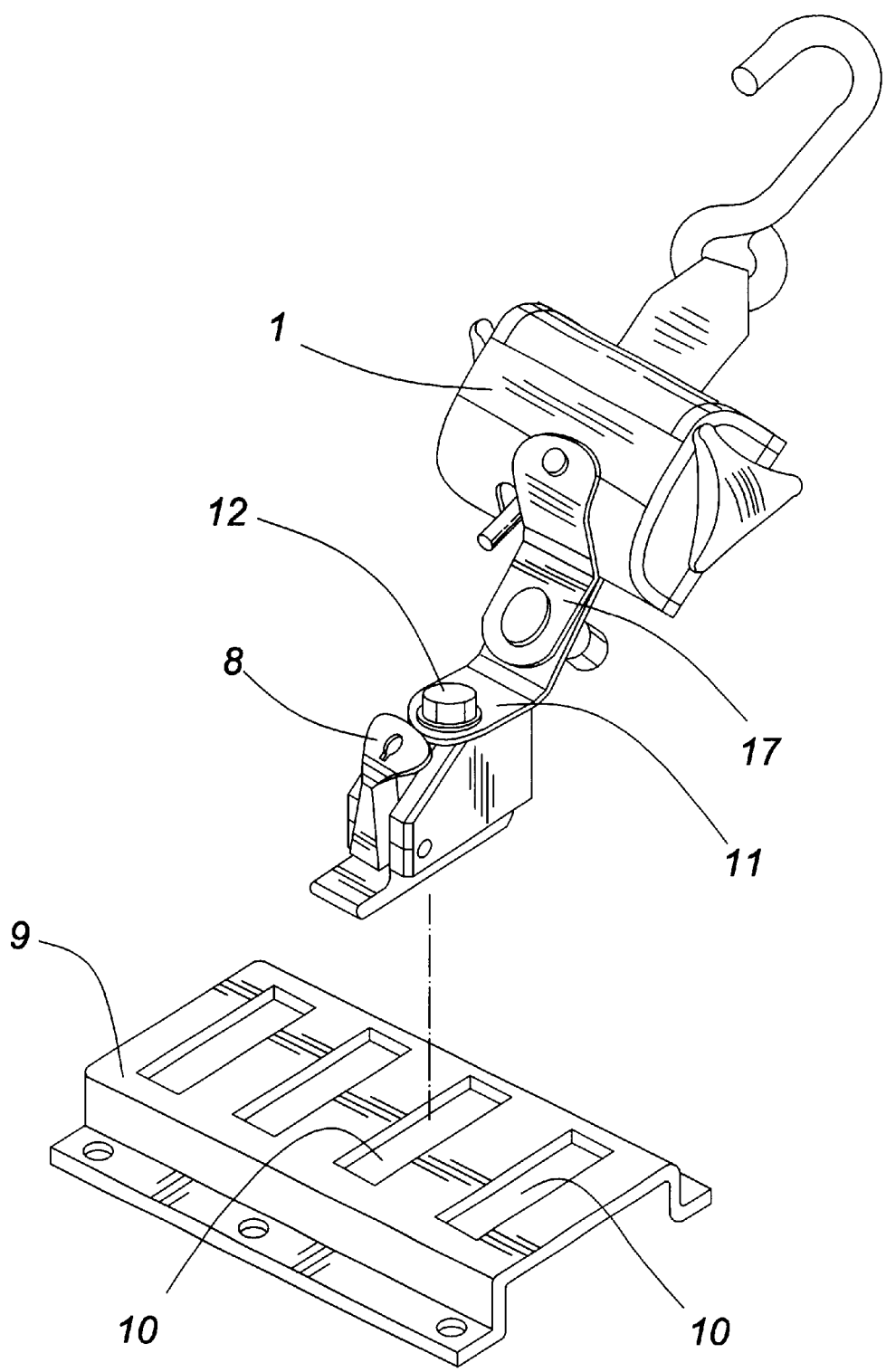
FIG. 2 shows a sketch of a seat belt retractor pivoting attachment system according to one aspect of the present invention.
Figure 3:
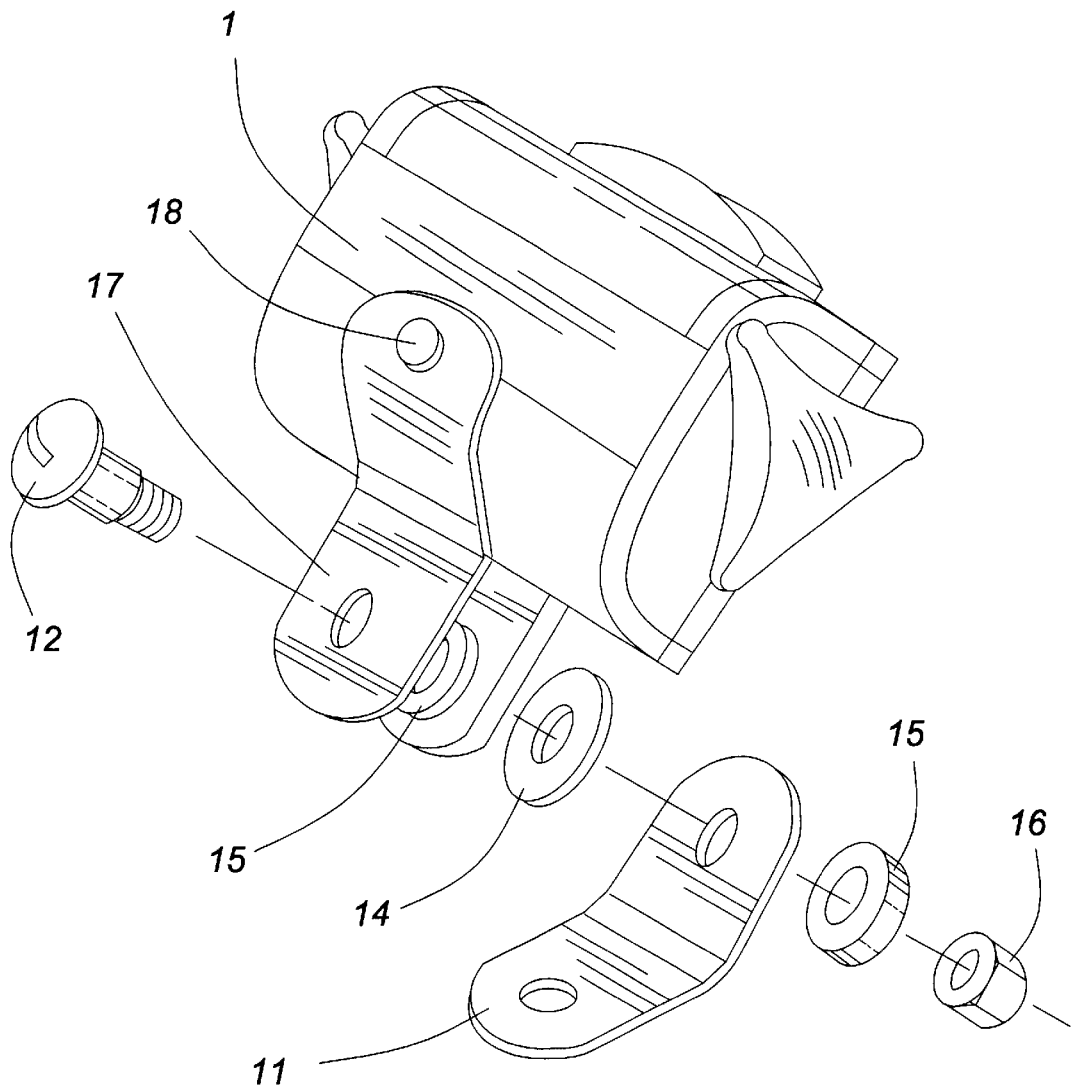
FIG. 3 shows an exploded view of the retractor of FIG. 2.
Figure 4:
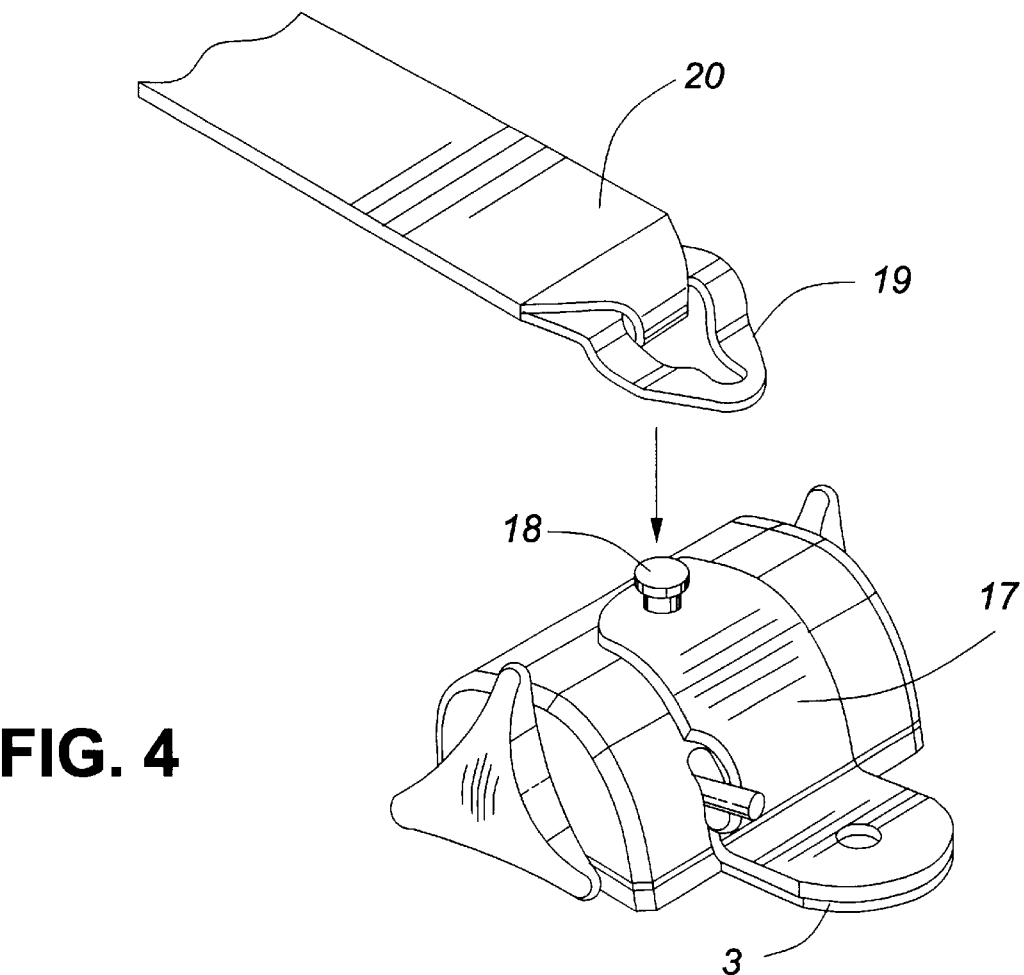
FIG. 4 shows a sketch of the retractor of FIG. 2 with the lap belt attachment.
Figure 5:
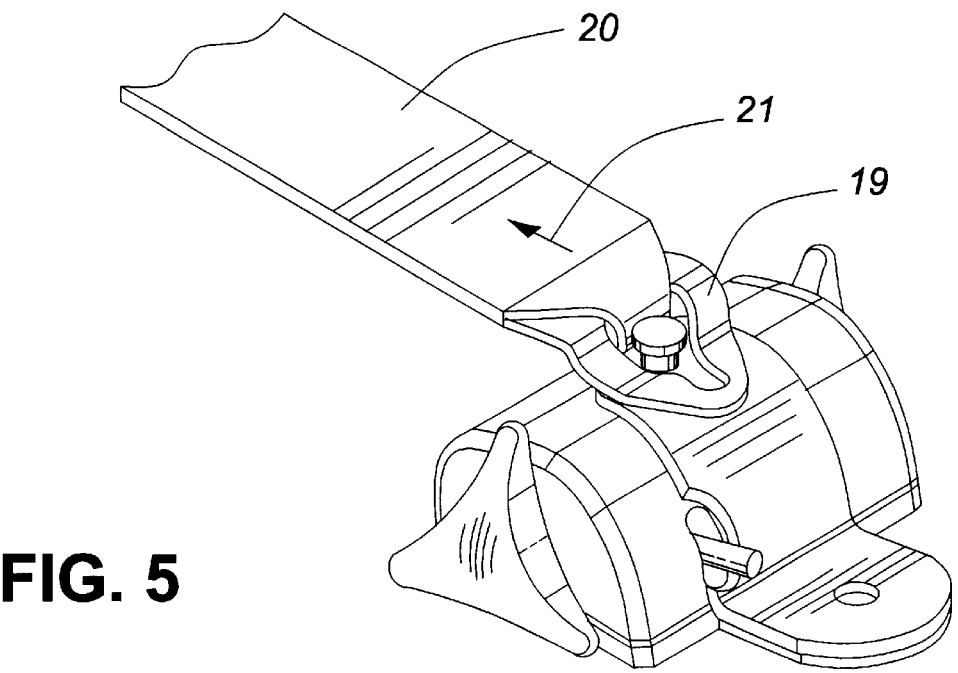
FIG. 5 shows the retractor of FIG. 2 with the lap belt attached.

In FIG. 1, there is shown a seat belt retractor 1 having a floor attachment means 2 mounted thereon for movement in a vertical or horizontal plane. Means 2 comprises a tongue 3 pivotally interconnected to a U-clip 4 by a blot 5 and nut 6. U-clip 4 is mounted on a ring 7 which in turn is releasably mounted on a floor track fitting 8 (FIG. 2). It will be appreciated that the retractor 1, which is preferably, but not essentially, of the design covered by U.S. Design Pat. No. D413,080, is free to move in both a vertical plane and in a horizontal plane when mounted as shown. In FIG. 2 there is shown a similar retractor 1 swivelly mounted, according to the present invention, for movement in a single plane approximately 45° to the horizontal track 9. Track fitting 8 is adapted so that it can be locked into place in any of the holes 10 in track 9. As seen more clearly in FIG. 3, a 45° angle bracket 11 is swivelly mounted, at the lower end thereof, by a bolt 12, to track fitting 8. The tongue 3 of retractor 1 is secured to the upper end of bracket 11, by a bolt 12, intermediate washers 13, 14, 15, and locknut 16. FIGS. 2 and 3 also show a lap belt attachment bracket 17 which overlies tongue 3 and is held in place by bolt 12 and nut 16. Bracket 17 is provided with a lap belt receiving pin 18. As seen in FIGS. 4 and 5, the female metal end 19 of a lap belt 20 is placed over pin 18 and snapped into locked position by pulling belt 20 in the direction of the arrow 21.

I claim:

1. In a wheelchair restraint system for use in a passenger carrying vehicle, which comprises a longitudinal floor mounting track having a plurality of parallel transverse slots therethrough, anchor means releasably and lockably mountable in a selected said slot in said mounting track, a seat belt retractor means and pivoting means for mounting said retractor means to said anchor means, the improvement wherein said pivoting means comprises first bracket means swivelly mounted at one end thereof to said anchor means so as to hold said retractor means at a selected angle, greater than zero, relative to said floor mounting track.

2. A restraint system as claimed in claim 1, wherein said selected angle is about 45°.

3. A restraint system as claimed in claim 1 including a lap belt attachment bracket mounted on said first bracket means at a second end thereof so as to overlie said retractor means.

4. A restraint system as claimed in claim 3 including a lap belt receiving pin mounted on said lap belt attachment bracket and adapted to receive, and releasably retain, a female end of a seat belt.

* * * * *